US012481321B2

(12) United States Patent
Malin

(10) Patent No.: US 12,481,321 B2
(45) Date of Patent: Nov. 25, 2025

(54) INFORMATION AND COMMUNICATIONS TECHNOLOGY CONVERSION APPARATUS

(71) Applicant: James Christopher Malin, Temecula, CA (US)

(72) Inventor: James Christopher Malin, Temecula, CA (US)

(*) Notice: Subject to any disclaimer, the term of this patent is extended or adjusted under 35 U.S.C. 154(b) by 203 days.

(21) Appl. No.: 18/199,925

(22) Filed: May 20, 2023

(65) Prior Publication Data

US 2023/0376074 A1 Nov. 23, 2023

Related U.S. Application Data

(60) Provisional application No. 63/446,365, filed on Feb. 17, 2023, provisional application No. 63/382,254, filed on Nov. 3, 2022, provisional application No. 63/365,172, filed on May 23, 2022.

(51) Int. Cl.
*G06F 1/16* (2006.01)

(52) U.S. Cl.
CPC ............ *G06F 1/1632* (2013.01); *G06F 1/166* (2013.01); *G06F 1/1681* (2013.01)

(58) Field of Classification Search
CPC .... G06F 1/1662; G06F 1/1664; G06F 1/1666; G06F 1/1667; G06F 1/1669; G06F 1/1671; G06F 1/1673; G06F 1/1632; G06F 1/163; G06F 1/1633; G06F 1/1637; G06F 1/1647; G06F 1/165; G06F 1/1654; G06F 1/1656; G06F 1/166
See application file for complete search history.

(56) References Cited

U.S. PATENT DOCUMENTS 5,537,343 A * 7/1996 Kikinis .................. G06F 1/183
361/679.41
5,835,733 A 11/1998 Walsh et al.
(Continued)

OTHER PUBLICATIONS

J. Du Toit et al. 2015. A model for secure mobile computing. 2015 Science and Information Conference (SAI), London, UK, pp. 1213-1221, doi: 10.1109/SAI.2015.7237299.
(Continued)

*Primary Examiner* — Imani N Hayman
*Assistant Examiner* — Ross Terry Mularski
(74) *Attorney, Agent, or Firm* — Daylight Law, P.C.

(57) ABSTRACT

Conversion apparatuses are disclosed that allow users to turn their smartphones, tablets, mini/micro PCs, smartwatches, and smart headsets/glasses into laptops or tablets. The laptop or tablet conversion saves money, eliminates the need to maintain or sync multiple operating systems, provides a larger screen for existing devices, and offers portability for mini/micro PCs. The laptop apparatus includes a keyboard, trackpad, speakers, input/output peripherals, charging hub, display, and optional battery pack, while the tablet apparatus has a touchscreen display, docking station, and optional battery pack. Both conversion apparatuses do not include a CPU, GPU, memory, operating system, or other software and hardware that come standard with the devices to be converted. The apparatuses can also accommodate external peripherals such as microphones, webcams, external mice, keyboards, and additional HDMI outputs.

15 Claims, 10 Drawing Sheets

(56) References Cited

U.S. PATENT DOCUMENTS

| | | | |
|---|---|---|---|
| 7,339,783 B2 * | 3/2008 | McEwan | G06F 1/1688 |
| | | | 361/679.55 |
| 7,350,011 B2 | 3/2008 | Keely et al. | |
| 8,725,205 B2 | 5/2014 | Ryan | |
| 9,083,812 B2 | 7/2015 | Ryan | |
| 9,201,593 B2 | 12/2015 | Collopy et al. | |
| 9,319,109 B2 | 4/2016 | Jurgovan et al. | |
| 11,074,024 B2 | 7/2021 | Santoso et al. | |
| 2006/0164800 A1 | 7/2006 | Mcewan et al. | |
| 2008/0055827 A1 | 3/2008 | Homer et al. | |
| 2010/0318709 A1 | 12/2010 | Bell et al. | |
| 2013/0260822 A1 * | 10/2013 | Wu | G06F 1/1632 |
| | | | 455/556.1 |
| 2016/0072327 A1 * | 3/2016 | Knutson | H04W 88/02 |
| | | | 320/108 |
| 2019/0146553 A1 * | 5/2019 | Azam | G06F 1/3218 |
| | | | 713/323 |
| 2019/0196551 A1 * | 6/2019 | Wang | H01R 13/635 |

OTHER PUBLICATIONS

International Search Report and Written Opinion from International Application No. PCT/US23/23032 dated Oct. 13, 2023, 16 pages.

* cited by examiner

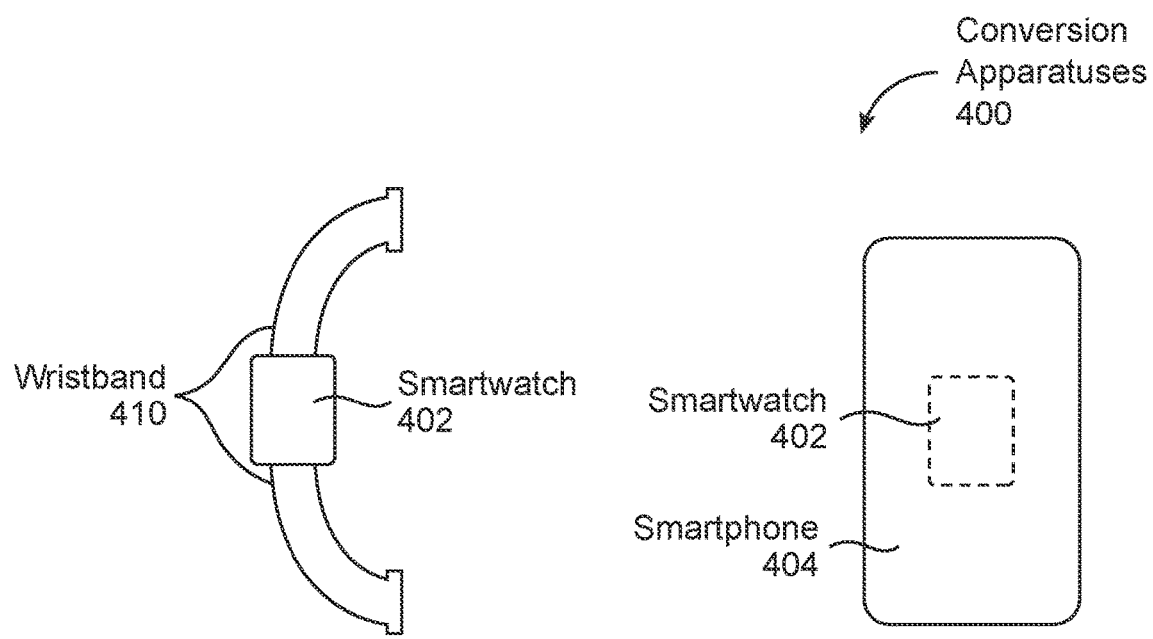
FIG. 9A
FIG. 9B
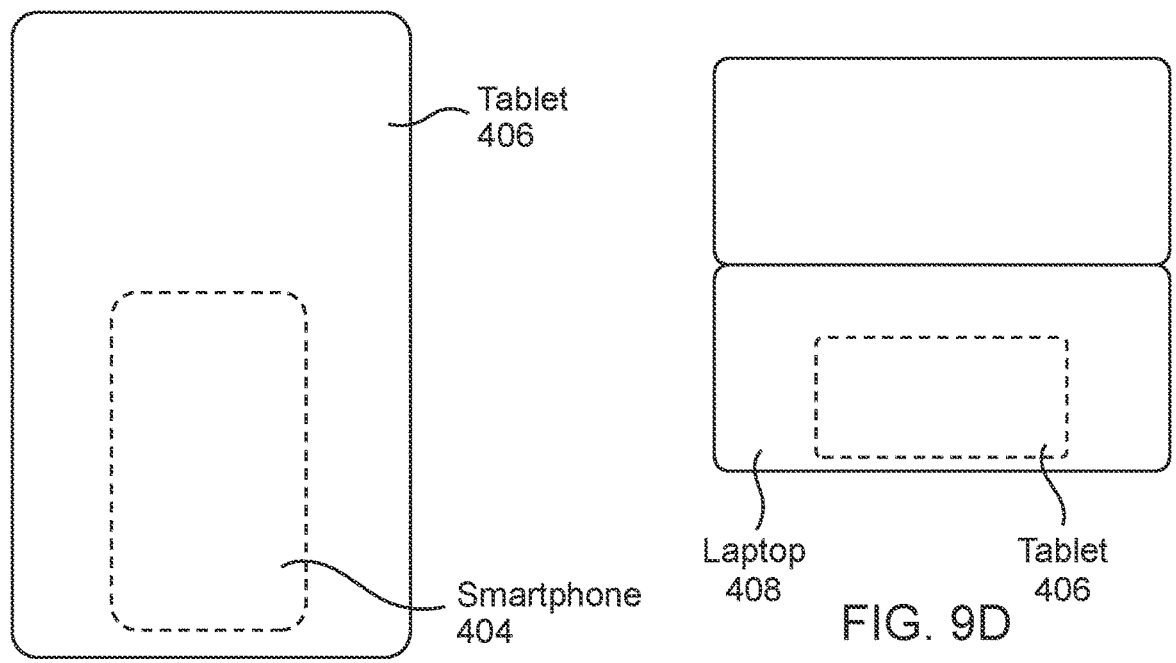
FIG. 9C
FIG. 9D

INFORMATION AND COMMUNICATIONS TECHNOLOGY CONVERSION APPARATUS

CROSS-REFERENCE TO RELATED APPLICATIONS

This application claims the benefit of U.S. Provisional Patent Application No. 63/382,254, filed Nov. 3, 2022, U.S. Provisional Patent Application No. 63/365,172, filed May 23, 2022, and U.S. Provisional Patent Application No. 63/446,365, filed Feb. 17, 2023, all of which are incorporated by reference herein in their entireties for all purposes.

BACKGROUND

Mobile devices such as smartphones have experienced a significant increase in computational capability and are commonly recognized as pocket-sized computers. Meanwhile, personal computer technology has undergone a reduction in form factor with the introduction of miniature desktops, microcomputers, and computer sticks, among other advancements. In addition, it is common for individuals who own a smartphone to also own a tablet and/or laptop, and those who possess a laptop may also have a personal computer at home. These devices require the maintenance of distinct operating systems and may necessitate periodic hardware upgrades or replacements. Furthermore, laptop displays may degrade over time due to various factors, including cable malfunctions or other defects, and the cost of replacing such components may vary depending on the year, model, and manufacturer.

SUMMARY

This disclosure relates to an apparatus configured for converting information and communications technology (ICT) devices to other form factors. Conventionally, individuals often need to purchase multiple expensive computing devices to meet their various computing needs. With the advent of technological advancements, personal computers have reduced in size to include miniature desktops, microcomputers, computer sticks, and more, while mobile devices such as smartphones have significantly increased in computational capability. However, owning multiple devices may necessitate maintaining and syncing separate operating systems, which can be time-consuming and costly. Additionally, laptop screens may degrade over time and require expensive replacements. As a result, there is a need for a cost-effective and flexible solution that can meet the varied computing needs of individuals without requiring multiple devices or complicated maintenance processes.

Implementations described herein address the aforementioned shortcomings and other shortcomings by providing an ICT conversion apparatus. For example, with the use of a laptop or tablet apparatus, individuals can convert their existing smartphone, tablet, smartwatch, smart headset/glasses, mini/micro PC, or other ICT devices into a laptop or tablet-like device. This conversion may eliminate the need to maintain or sync multiple operating systems, reducing costs and increasing ease of use. Additionally, this technology provides users with a larger screen, a keyboard, a trackpad, and other input/output peripherals, making it more convenient to work on the go. This technology also provides a solution for users with a broken laptop screen, allowing them to convert another laptop into a functional device. The inclusion of various external peripherals also allows for customization and flexibility, depending on individual needs.

One aspect relates to a docking station for a nestable computing device. The docking station may include a set of user interface components, a chassis, and a nestable computing device interface. The set of user interface components may include a display and a keyboard. The nestable computing device may control the set of user interface components when the nestable computing device is docked in the docking station. The set of user interface components may be attached to the chassis. The nestable computing device interface may be for securing the nestable computing device to the chassis when the nestable computing device is docked in the docking station. The keyboard may be movable relative to the chassis between a first position and a second position. The nestable computing device interface may be exposed in the first position and may be covered by the keyboard in the second position.

Another aspect relates to a docking station for a nestable computing device. The docking station may include a set of user interface components, a chassis, a nestable computing device interface, and an adjustable engagement interface. The set of user interface components may include a display and a keyboard. The nestable computing device may control the set of user interface components when the nestable computing device is docked in the docking station. The set of user interface components may be attached to the chassis. The nestable computing device interface may be for securing the nestable computing device to the chassis when the nestable computing device is docked in the docking station. The adjustable engagement interface may be adjustable to accommodate components of different sizes. For example, the adjustable engagement interface may accept different keyboards, number pads, nestable computing devices, track pads, displays, cameras, memories, power hubs, batteries, and other components that will be a part of the docking station. The nestable computing device interface can itself also be an adjustable interface to accommodate nestable computing devices of different sizes. A docking station can include multiple adjustable engagement interfaces to accept multiple components of different sizes to increase the versatility of the docking station and provide a high degree of customizability. The adjustable engagement interface may fit the keyboard in a first configuration and a second keyboard in a second configuration. The keyboard and the second keyboard may not be congruent.

Yet another aspect relates to a docking station for a nestable computing device. The docking station may include a first set of user interface components, a first chassis, a second docking station, a second set of user interface components, a second chassis, a first nestable computing device interface, and a second nestable computing interface. The first set of user interface components may include a first display and a first user input interface. The nestable computing device may control the first set of user interface components when the nestable computing device is docked in the docking station. The first set of user interface components may be attached to the first chassis. The second set of user interface components may include a second display and a second user interface. The nestable computing device may control the second set of user interface components when the nestable computing device is docked in the second docking station. The second chassis may form the second docking station. The second set of user interface components may be attached to the second chassis for a second docking station. The first nestable computing device interface may be for securing the second docking station to the first chassis when the second docking station is docked to the docking station. The second nestable computing device interface may be for securing the nestable computing device to the second chassis when the nestable computing device is docked in the second docking station.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIGS. 9A, 9B, 9C, and 9D provide examples of conversion apparatuses, that are part of an "electronic nesting doll", consisting of a smartwatch, smartphone, tablet, and laptop, in accordance with specific embodiments of the inventions disclosed herein.

DETAILED DESCRIPTION

Figure 1:
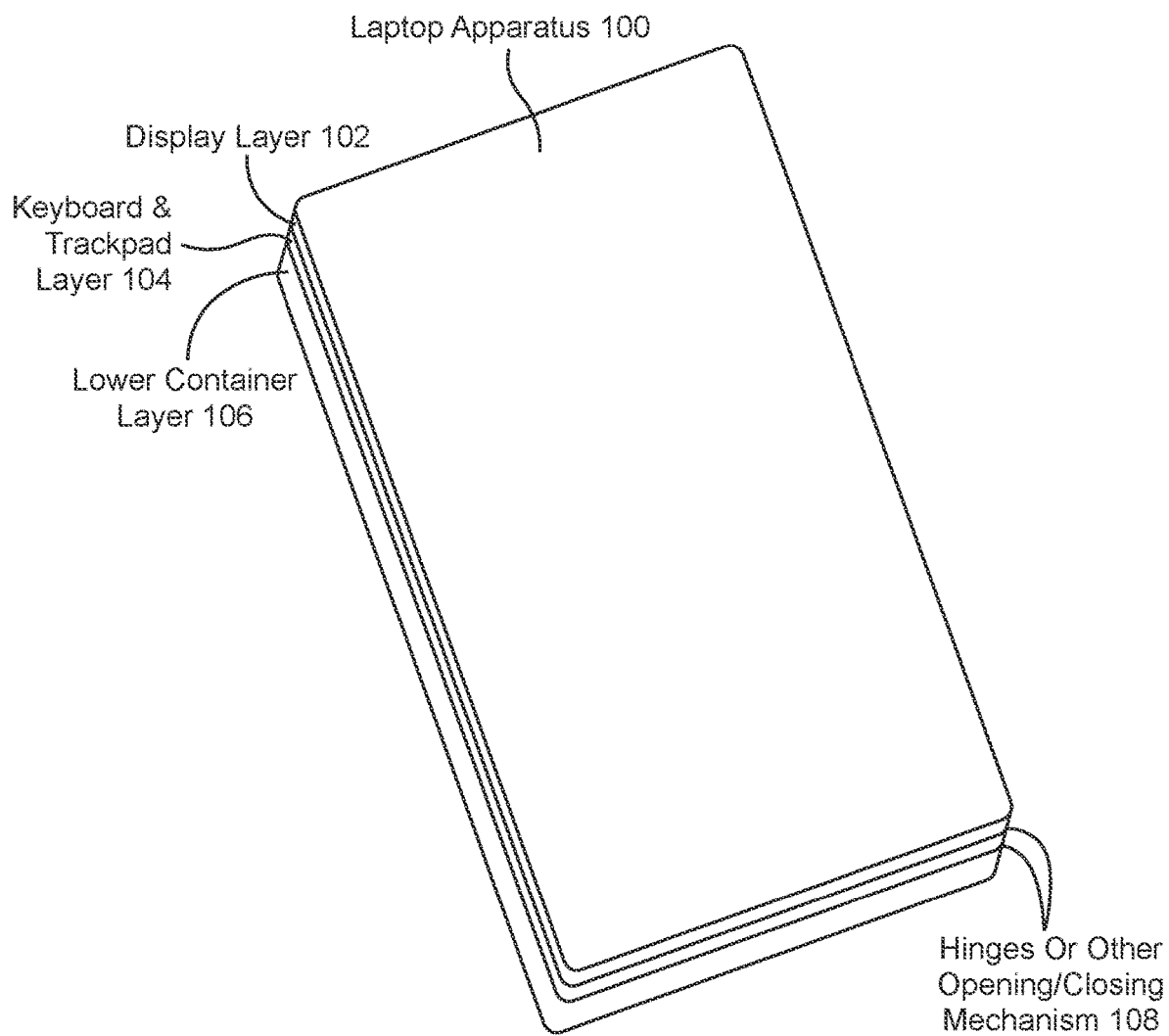
FIG. 1 provides an example of a laptop apparatus, a display layer, a keyboard and trackpad layer, a lower container layer, and hinges or other opening/closing mechanisms, in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different apparatuses configured for converting ICT devices to other form factors are described in detail in this disclosure. The methods and systems disclosed in this section are non-limiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

The laptop and tablet ICT conversion apparatus may include a device that allows users to convert their smartphones, tablets, smartwatches, smart headsets, and other ICT devices into a laptop or tablet. The apparatus may be cost-effective and save users money as they do not need to buy additional ICT devices. The apparatus may reduce the need to maintain or sync multiple operating systems, and provide additional ease of use and a larger screen for existing devices.

The apparatus may include a keyboard, a trackpad, speakers, straps, or other mechanisms to hold the device in place, input/output peripherals (e.g., USB hub with HDMI and audio jack), a charging hub or two or more separate hubs allowing for input and output, a display, an optional rechargeable battery pack or power bank, and other components that would normally be present in a laptop. However, according to some embodiments, the apparatus does not include a CPU, GPU, memory, operating system, and other software and hardware that comes standard with the ICT device to be converted.

The apparatus may be designed to be compatible with various ICT devices, including mini or micro PCs, tablets, smartphones, smartwatches, smart headsets/glasses, and other devices with the proper inputs and outputs. The apparatus may accommodate external peripherals such as microphones, webcams, external mice, and keyboards.

Exemplary embodiments include at least two types of apparatus: a laptop apparatus and a tablet apparatus. The laptop apparatus may be designed to convert the device into an apparatus with the appearance of a laptop, while the tablet apparatus may convert the device into an apparatus with the appearance of a tablet.

The laptop apparatus may have a larger screen than the device being converted and may utilize the existing CPU, GPU, memory, operating system, and other software and hardware that comes standard with the device. The laptop apparatus may include one or more of a keyboard, an optional trackpad, speakers, input/output peripherals, a charging hub or two or more separate hubs, a display, and/or other components.

The tablet apparatus, on the other hand, may have a touchscreen display and may be designed to be compatible with various ICT devices. It may have a docking station with one or more input/output hubs, an optional battery pack, a touchscreen display, and/or other components.

FIG. 1 provides an example of a laptop apparatus 100, a display layer 102, a keyboard and trackpad layer 104, a lower container layer 106, and hinges or other opening/closing mechanism 108, in accordance with specific embodiments of the inventions disclosed herein. The laptop apparatus 100 may be designed to provide an efficient and user-friendly computing experience for users. The display layer 102 may include a high-resolution screen that is capable of displaying crisp images and videos. The keyboard and trackpad layer 104 may provide an intuitive typing and pointing experience to users. The lower container layer 106 may house a motherboard, power supply, and other electronic components necessary to operate the laptop apparatus 100.

The hinges or other opening/closing mechanism 108 may allow the display layer 102 to be tilted at different angles and adjusted to the user's preferences. The hinges may be designed to be sturdy and durable, ensuring that the laptop apparatus 100 can withstand frequent use and travel. The hinges or other opening/closing mechanism 108 may secure the laptop apparatus 100 when not in use. The hinges or other opening/closing mechanism 108 may ensure that the display layer 102 and keyboard and trackpad layer 104 are tightly closed, preventing any dust or debris from entering the laptop apparatus 100. In specific embodiments, portions of the keyboard and trackpad layer 104, or the entire layer, may be movable between a first position and a second position where a nestable device can be placed within or removed from the lower container layer 106 when the portion or layer is in the first position, and the nestable device is covered when the portion or layer is in the second position.

According to some embodiments, the laptop apparatus 100 may include additional components such as speakers, a camera, and a microphone. These components may be designed to enhance the user's multimedia experience and facilitate communication with others.

Figure 2:
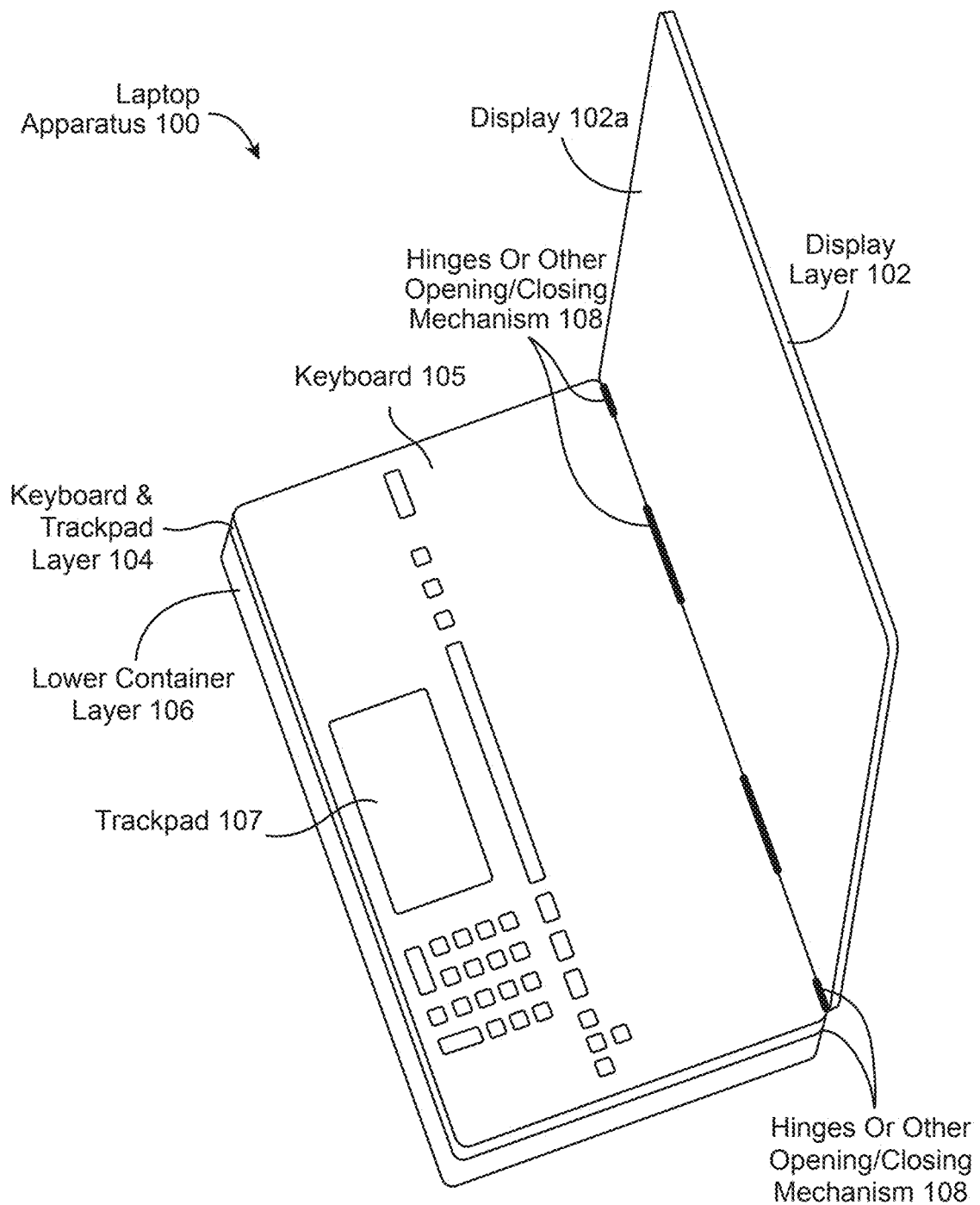
FIG. 2 provides an example of the inside of a laptop apparatus, a display layer, a display, a keyboard and trackpad layer, a keyboard and trackpad, a lower container layer, and hinges or other opening/closing mechanisms, in accordance with specific embodiments of the inventions disclosed herein.

FIG. 2 provides an example of the inside of the laptop apparatus 100, the display layer 102, a display 102a, the keyboard and trackpad layer 104, a keyboard 105, a trackpad 107, the lower container layer 106, and the hinges or other opening/closing mechanism 108, in accordance with specific embodiments of the inventions disclosed herein. The display layer 102 may include the display 102a, which is used to provide visual output to the user. The display 102a may include an LCD, LED, or other types of display. The keyboard and trackpad layer 104 may include the keyboard 105 and trackpad 107, which are used to input data into the laptop apparatus 100. The keyboard 105 and trackpad 107 may be integrated into a single layer or may be separate layers. In specific embodiments, the trackpad 107 can be the nestable device (e.g., a smartphone).

The lower container layer 106 may provide structural support for the laptop apparatus 100 and may include various components such as a battery, hard drive, and others. The hinges or other opening/closing mechanism 108 may provide a means for opening and closing the laptop apparatus 100. The hinges or other opening/closing mechanism 108 may include a traditional hinge mechanism or may be sliding or other types of mechanism.

In some embodiments, the display layer 102 and the keyboard and trackpad layer 104 may be separated by a gap, which may be filled with heat-dissipating material. This gap may allow for improved heat dissipation and may improve the overall performance of the laptop apparatus 100. Additionally, the keyboard and trackpad layer 104 may be removable or interchangeable, allowing for customization or replacement of the input devices.

Figure 3:
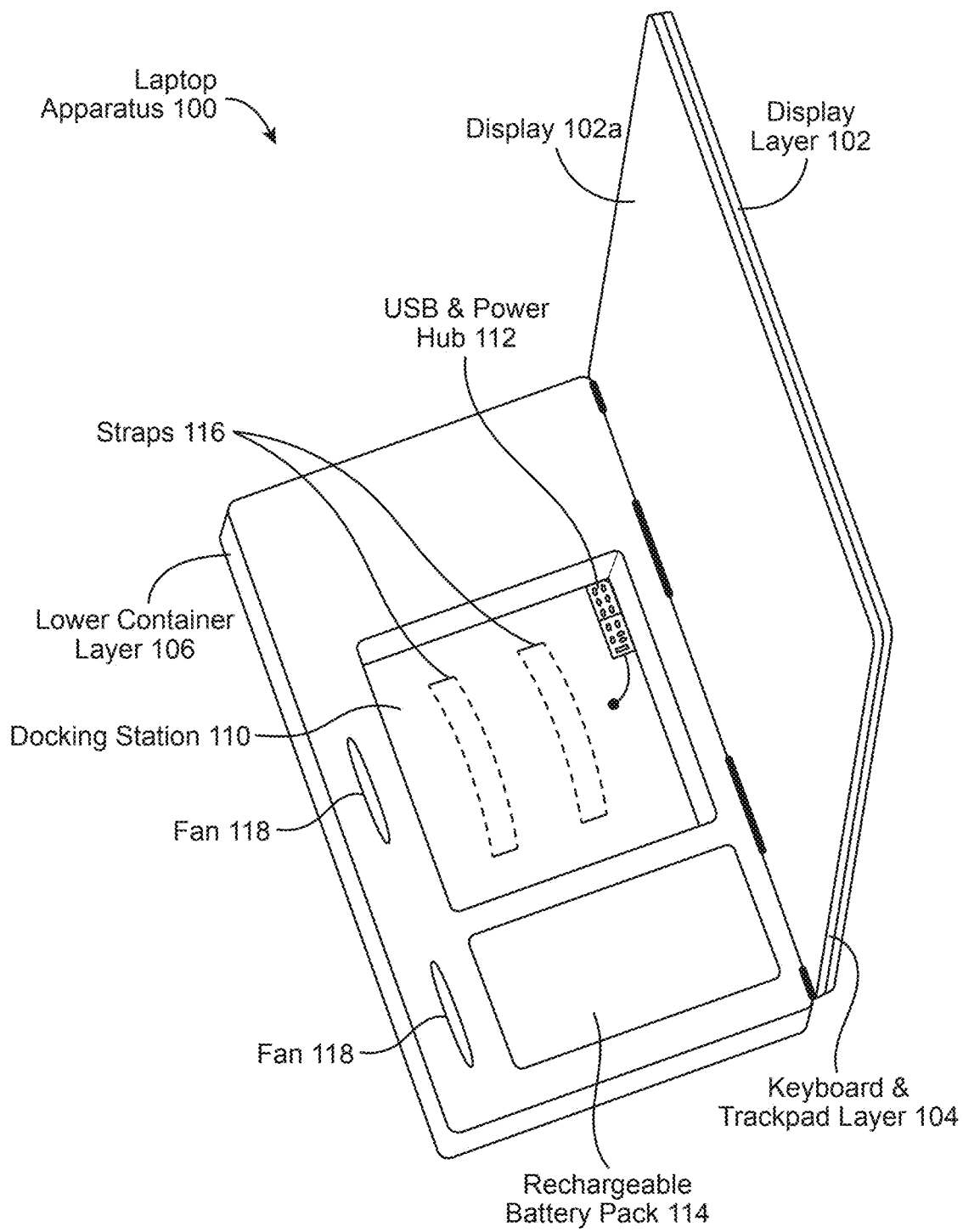
FIG. 3 provides an example of the inside of a laptop apparatus, a display layer, a keyboard and trackpad layer, the bottom of said keyboard/trackpad layer, a lower container layer, a docking station, a USB and power hub for both input and output, a rechargeable battery pack, straps, and onr or mre fans, in accordance with specific embodiments of the inventions disclosed herein.

FIG. 3 provides an example of the inside of the laptop apparatus 100, the display layer 102, the keyboard and trackpad layer 104, the bottom of the keyboard and trackpad layer 104, the lower container layer 106, a docking station 110, a USB and power hub 112 for both input/output, a rechargeable battery pack 114, straps 116, and one or more fans 118, in accordance with specific embodiments of the inventions disclosed herein. The display layer 102 may be the uppermost layer of the laptop apparatus 100 and may be responsible for presenting visual information to the user. It may include a display screen, a display controller, and other associated hardware components that work together to produce a high-quality visual output.

The keyboard and trackpad layer 104 may be positioned immediately below the display layer 102 and may include a keyboard 105 and a trackpad 107 for user input. The keyboard may include keys that are used to input alphanumeric characters, and it may also include function keys and other specialized keys. The trackpad may be used to control the movement of the cursor on the screen and to perform other functions, such as scrolling and clicking.

The bottom of the keyboard and trackpad layer 104 may be the surface of the laptop apparatus 100 that is in contact with the user's desk or another surface. It may include feet or other features that provide stability and prevent slipping. The lower container layer 106 may be positioned below the keyboard and trackpad layer 104 and includes the internal components of the laptop apparatus 100. This may include a processor, memory, storage, and other components that are necessary for the laptop to function.

The docking station 110 may allow the user to dock the laptop apparatus 100 with other devices. This may include a desktop computer, a monitor, a printer, or other devices. The USB and power hub 112 may provide input/output ports for USB devices and a power supply for the laptop and other devices (e.g., larger devices). The rechargeable battery pack 114 may be a source of power for the laptop apparatus 100 (or other devices) when it is not connected to a power supply. The straps 116 may be used to secure a nested device when it is docked in docking station 110 and when it is being transported, and the one or more fans 118 may help to cool the internal components of the laptop to prevent overheating.

Figure 4:
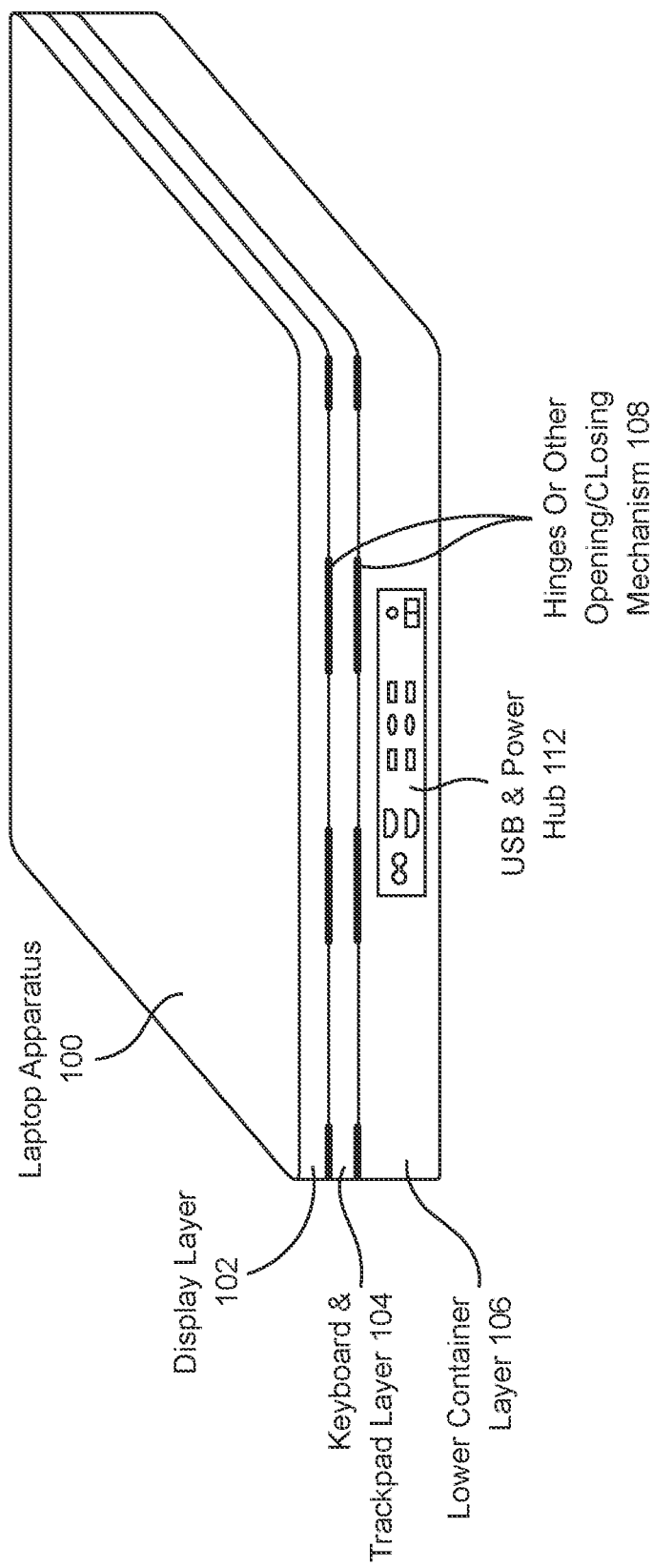
FIG. 4 provides an example of a laptop apparatus from the back, a display layer, a keyboard and trackpad layer, a lower container layer, hinges or other opening/closing mechanisms, and a USB and power hub, in accordance with specific embodiments of the inventions disclosed herein.

FIG. 4 provides an example of the laptop apparatus 100 from the back, the display layer 102, the keyboard and trackpad layer 104, the lower container layer 106, the hinges or other opening/closing mechanism 108, and the USB and power hub 112 in an external configuration, in accordance with specific embodiments of the inventions disclosed herein. In this figure, the hinges or other opening/closing mechanism 108 may be a hinge mechanism that allows the display layer 102 to rotate about an axis, which may be located at the back of the laptop apparatus 100. The hinge mechanism may be made of a material that is strong and durable enough to withstand repeated opening and closing of the laptop apparatus 100.

The USB and power hub 112 may be located at the back of the laptop apparatus 100, in close proximity to the hinges or other opening/closing mechanism 108. The USB and power hub 112 may be designed to provide a convenient and easy-to-use interface for connecting external devices and charging the laptop apparatus 100. The USB and power hub 112 may include multiple USB ports, power outlets, and other types of connectors, and may be integrated with the hinges or other opening/closing mechanism 108 to provide a compact and space-efficient design.

The keyboard and trackpad layer 104 may be located on the lower container layer 106 and may be designed to provide a comfortable and ergonomic typing experience for users. The keyboard may include a standard QWERTY layout, along with additional function keys and multimedia controls. The trackpad may be located below the keyboard and may be used to control the cursor on the display layer 102. The trackpad may be sensitive to touch and pressure and may support multi-finger gestures for scrolling, zooming, and other types of input.

Figure 5A:
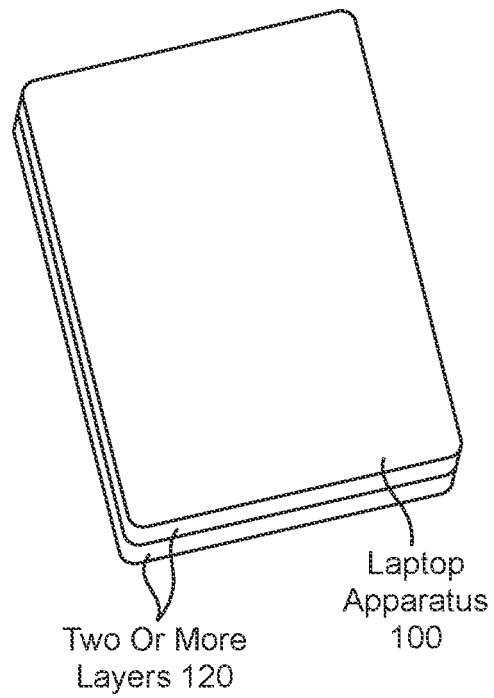
FIGS. 5A, 5B, and 5C provide an example of a laptop apparatus to show that different layers can consist of two or more layers, at a minimum containing a top and bottom, with different internal and external layouts, in accordance with specific embodiments of the inventions disclosed herein.
Figure 5B:
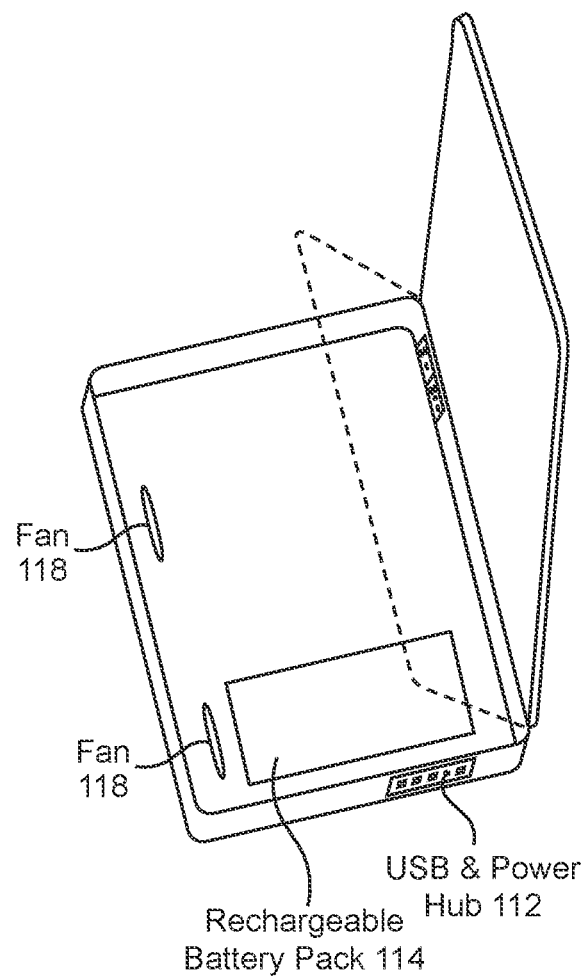
Figure 5C:
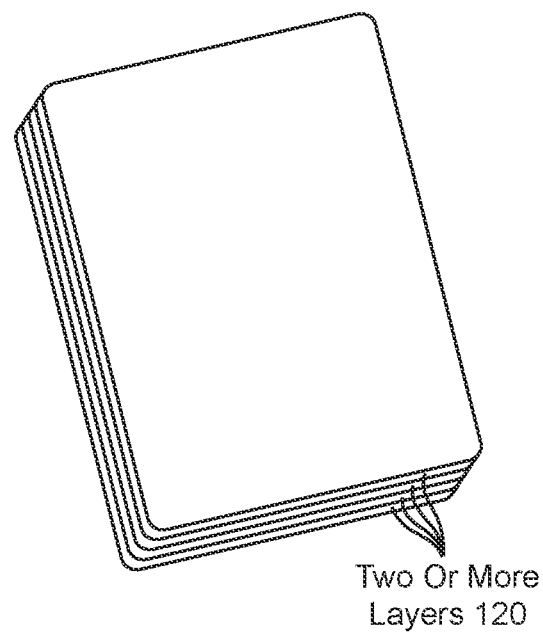

FIGS. 5A, 5B, and 5C provide an example of the laptop apparatus 100 to show that different layers can consist of two or more layers 120, at a minimum containing a top and bottom, with different internal and external layouts, in accordance with specific embodiments of the inventions disclosed herein. As illustrated, transitioning the keyboard and trackpad out of the way in the example of FIG. 5B exposes the internals of the laptop apparatus 100. The internals of the laptop apparatus can include the internal, built-in components of the apparatus as well as a docking area for docking a nestable device with the laptop apparatus 100.

Figure 6:
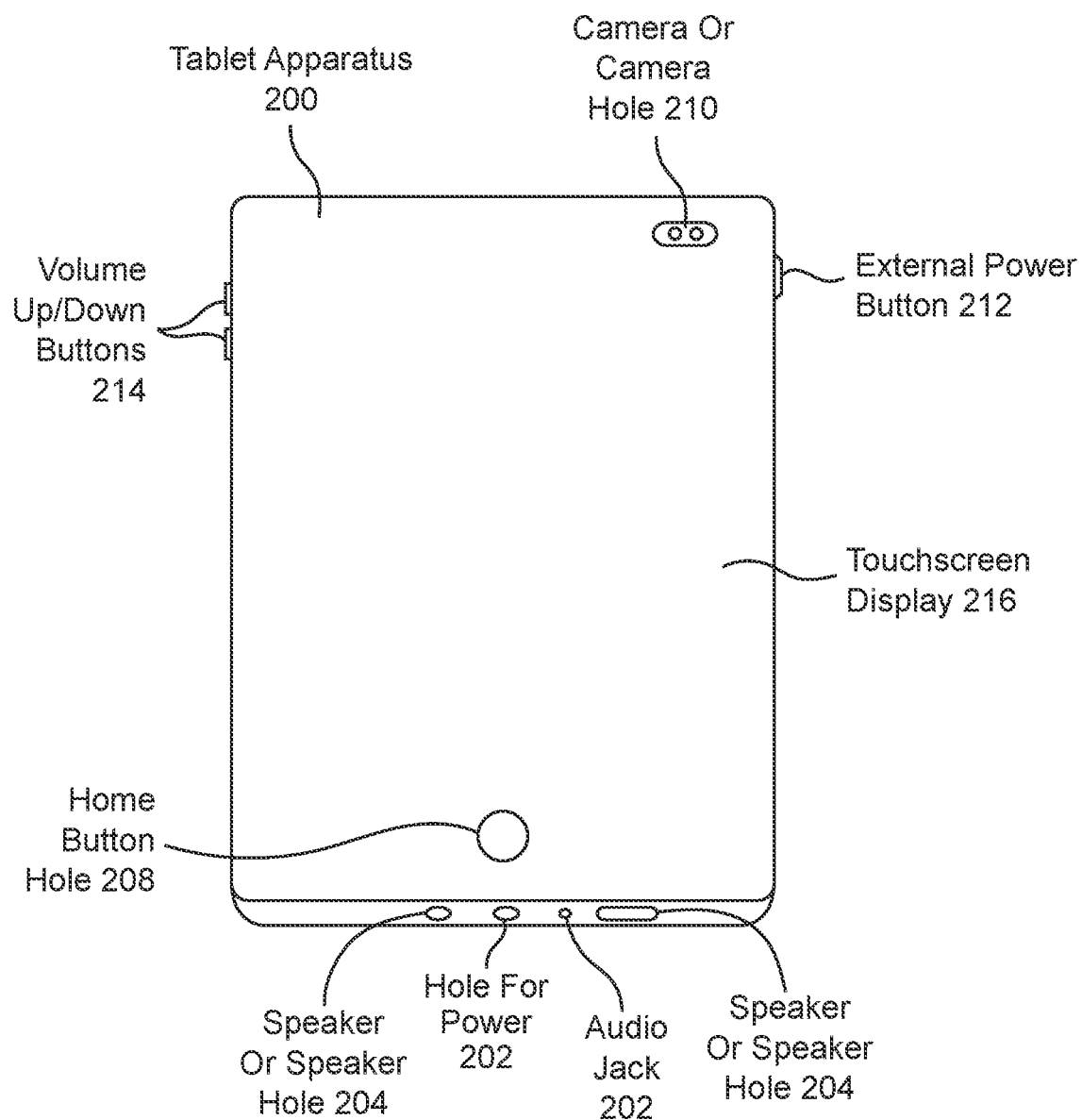
FIG. 6 provides an example of a tablet apparatus with holes for power, speakers or speaker holes, an audio jack hole, a home button hole, a camera or camera hole, an external power button, and volume up/down buttons on the sides, in accordance with specific embodiments of the inventions disclosed herein.

FIG. 6 provides an example of a tablet apparatus 200 with holes for power 202, speakers or speaker holes 204, an audio jack hole 206, a home button hole 208, a camera or camera hole 210, an external power button 212, and volume up/down buttons 214, in accordance with specific embodiments of the inventions disclosed herein. These components may be positioned on the sides or other surfaces of the tablet apparatus 200 to provide easy access to the user. For instance, the holes for power 202 may be positioned near the bottom of the tablet apparatus 200, while the audio jack hole 206 and camera hole 210 may be positioned near the top of the tablet apparatus 200. As shown, the tablet apparatus 200 also includes a touchscreen display 216, which may be any suitable type of display such as an LCD or OLED touchscreen display.

The external power button 212 and volume up/down buttons 214 may be positioned on the sides of the tablet apparatus 200. These buttons may be used to turn on and off the tablet apparatus 200, adjust the volume and perform other functions. In some implementations, the external power button 212 may be positioned near the top of the tablet apparatus 200, while the volume up/down buttons 214 may be positioned near the bottom of the tablet apparatus 200. Additionally, these buttons may be positioned and designed to be easy to press and operate, while also being durable enough to withstand frequent use.

In some embodiments, the tablet apparatus 200 may include a protective cover that covers the holes and buttons. This cover may be removable and replaceable, allowing the user to customize the look and feel of the tablet apparatus 200. Additionally, the cover may be designed to provide additional protection to the tablet apparatus 200, helping to prevent scratches and other types of damage. The cover may also include additional features, such as a stand or handle, to make it easier to use the tablet apparatus 200 in various situations.

Figure 7:
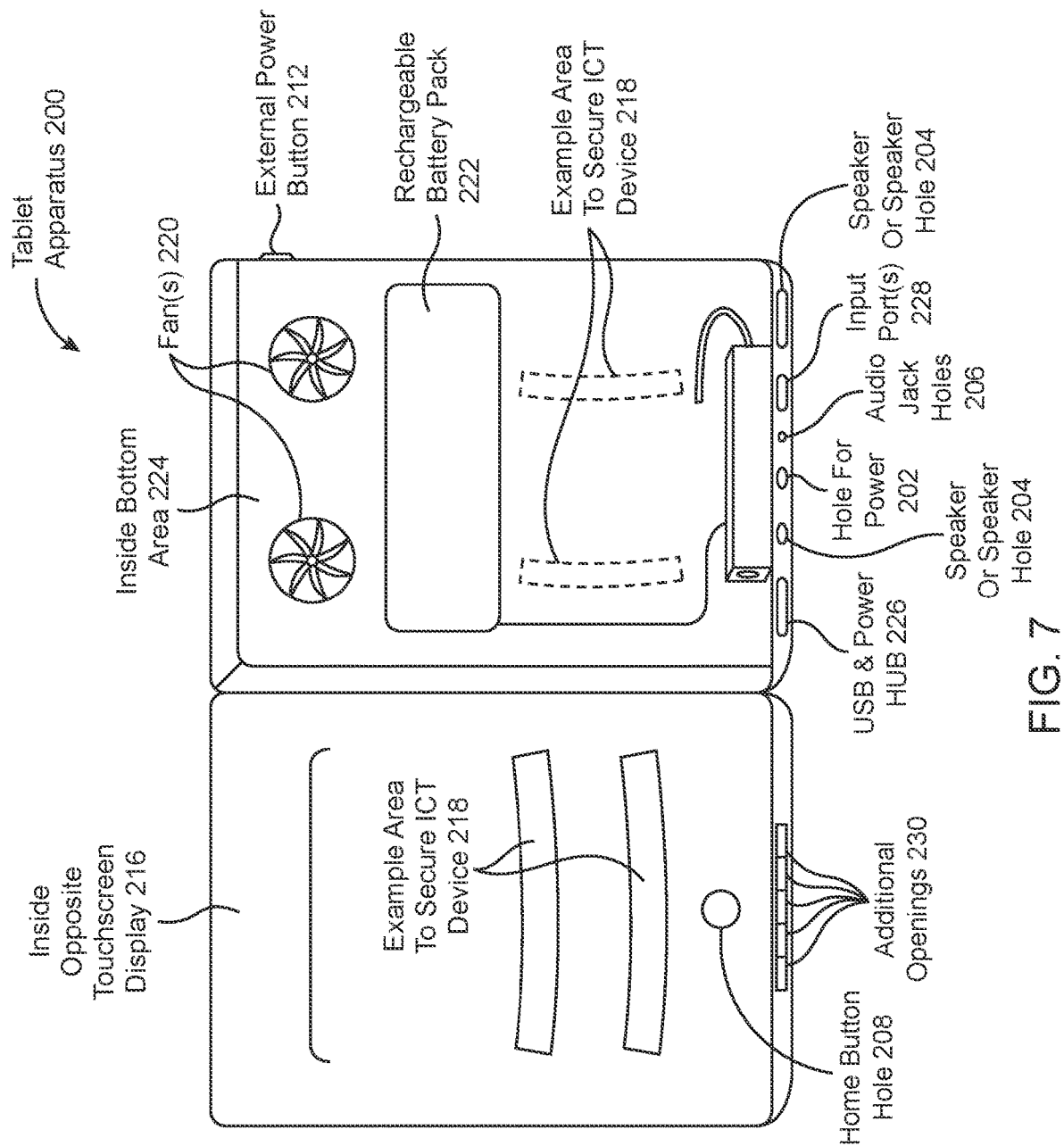
FIG. 7 provides an example of the inside of a tablet apparatus, two example areas to strap or set in place an ICT device (e.g., smartphone), one or more fans, speakers or speaker holes, an audio jack hole, a rechargeable battery pack, a home button hole, a power button on the side, the inside bottom area, and a USB and power hub, in accordance with specific embodiments of the inventions disclosed herein.

FIG. 7 provides an example of the inside of the tablet apparatus 200, two example areas to strap or set in place a nestable device such as an ICT device 218 (e.g., smartphone), one or more fans 220, the speakers or speaker holes 204, the audio jack hole 206, a rechargeable battery pack 222, a home button hole 208, a power button 212 on the side, the inside bottom area 224, and the USB and power hub 226, in accordance with specific embodiments of the inventions disclosed herein. The tablet apparatus 200 may include one or more input ports 228 (e.g., USB inputs for a mouse, keyboard, and other external devices) and additional openings 230 at the bottom of the tablet apparatus 200.

In some embodiments, the one or more fans 220 may be configured to provide airflow to the ICT device to prevent overheating during use. The one or more fans 220 may be positioned in a way that ensures maximum air circulation and may be equipped with a filter to prevent dust and debris from entering the tablet apparatus 200. The one or more fans 220 may also be controlled by a temperature sensor, allowing the one or more fans 220 to turn on or off automatically based on the temperature inside the tablet apparatus 200.

The rechargeable battery pack 222 may be configured to provide power to the tablet apparatus 200, the ICT device, and/or other devices (e.g., larger devices). The rechargeable battery pack 222 may be removable and replaceable, allowing the user to swap out a dead battery for a fully charged one. The rechargeable battery pack 222 may also be equipped with a charging circuit, allowing it to charge the ICT device when it is connected to the tablet apparatus 200.

The USB and power hub 226 may be configured to provide a variety of connectivity options for the tablet apparatus 200 and the ICT device. The USB and power hub 226 may include one or more USB ports, allowing the user to connect peripherals such as a keyboard or mouse. The USB and power hub 226 may also include a power outlet, allowing the user to charge other devices using the tablet apparatus 200 as a power source.

In certain embodiments, the inside bottom area 224 may be configured to provide storage space for small items such as memory cards or spare batteries. The inside bottom area 224 may be accessed by opening a cover or panel having the touchscreen display 216 of the tablet apparatus 200. The inside bottom area 224 may also include a clip or holder to secure the small items in place and prevent them from moving around during use.

Figure 8:
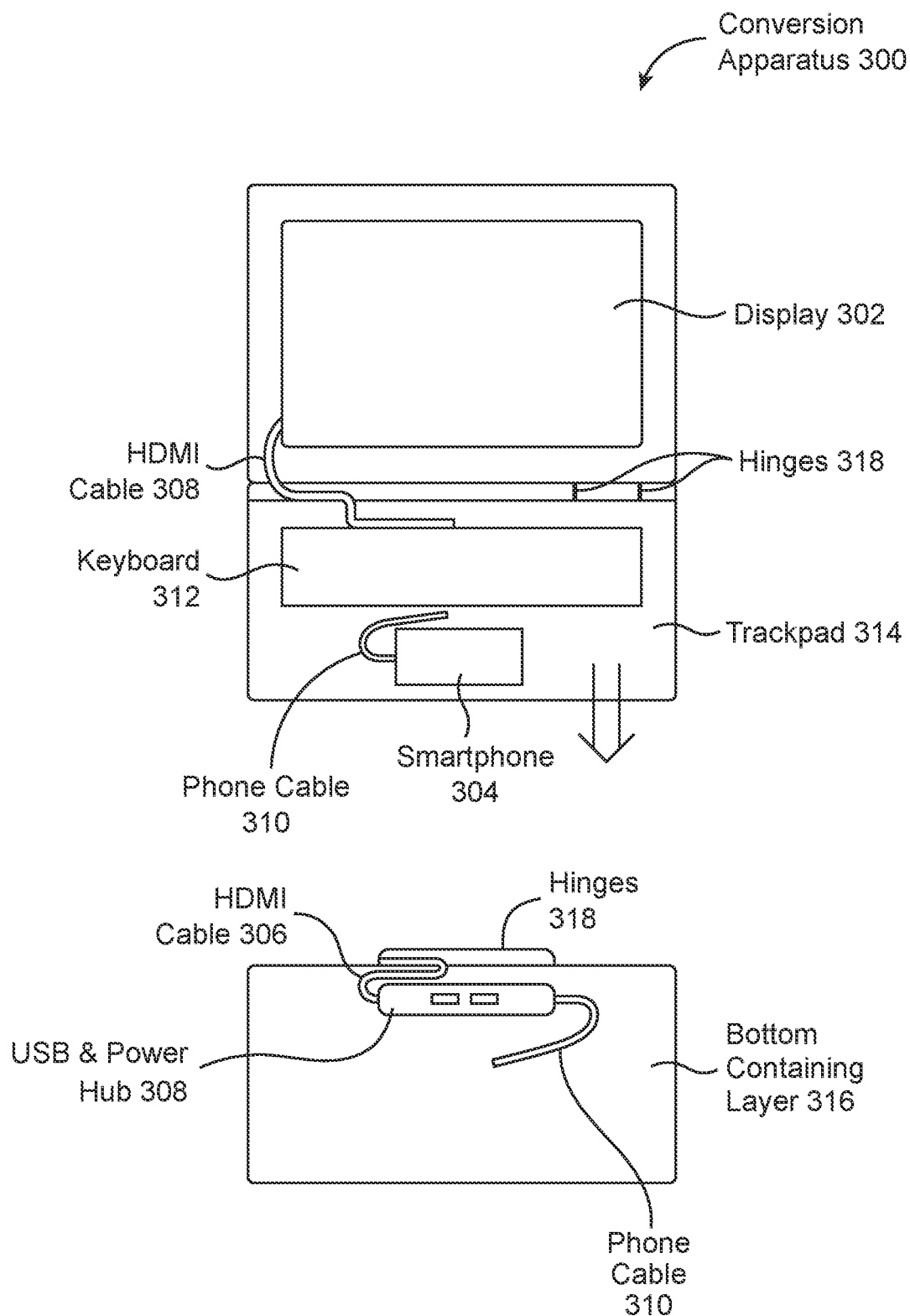
FIG. 8 provides an example of a conversion apparatus, consisting of a display, a smartphone, a keyboard, an HDMI cable, a phone cable (e.g., USB-C), an input/output and charging hub, and hinges; converting a smartphone into a laptop, in accordance with specific embodiments of the inventions disclosed herein.

FIG. 8 provides an example of a conversion apparatus 300 that may be used to convert a smartphone into a laptop. As shown, the conversion apparatus 300 includes a display 302, which may be any suitable type of display such as an LCD or OLED display. A smartphone 304 may be connected to the display 302 via an HDMI cable 306, which may include any suitable type of HDMI cable capable of transmitting high-definition video signals. The smartphone 304 may also be connected to a USB and power hub 308 via a phone cable 310, such as a USB-C cable.

In addition to the display 302, the conversion apparatus 300 may include a keyboard 312, which may be any suitable type of keyboard such as a physical QWERTY keyboard or a virtual keyboard displayed on the display 302. The keyboard 312 may be connected to the smartphone 304 via Bluetooth or any other suitable wired or wireless communication protocol. The conversion apparatus 300 may include a trackpad 314 positioned near the keyboard 312, with similar connectivity to the smartphone 304.

To enable the conversion apparatus 300 to be used as a laptop, the display 302 and the keyboard 312 may be connected to a bottom containing layer 316 via hinges 318. The hinges 318 may be any suitable type of hinge that allows the display 302 and the keyboard 312 to be positioned at various angles (e.g., a first open position and a second closed position) relative to the bottom containing layer 316.

The conversion apparatus 300 may be used to provide a more convenient and comfortable way to use a smartphone for tasks that typically require a laptop, such as typing documents or browsing the internet. By converting a smartphone into a laptop, users may be able to take advantage of the computing power and versatility of their smartphones while still enjoying the larger display and more comfortable typing experience of a laptop. Furthermore, this degree of versatility can be implemented between different form factors such as between a smartwatch and a smartphone, or a smartphone and a tablet. Further still, individual systems can include multiple levels of nesting such that a smartwatch can be combined with a tablet computer, which is then in turn combined with a laptop computer. The original device that was nested at the first level can then continue to provide computing resources for the larger devices as the form factor continues to increase.

FIGS. 9A, 9B, 9C, and 9D provide examples of conversion apparatuses 400, which are part of an "electronic nesting doll" design, which includes configurations for a smartwatch 402 (see FIG. 9A), a smartphone 404 (see FIG. 9B), a tablet 406 (see FIG. 9C), and a laptop 408 (see FIG. 9D), in accordance with specific embodiments of the inventions disclosed herein. The figures illustrate an electronic nesting doll design comprising various devices that can be converted from one form to another, such as a smartwatch that can be converted to a smartphone, a smartphone that can be converted to a tablet, a tablet that can be converted to a laptop, and a laptop that can be converted to a desktop computer.

In particular, FIG. 9A illustrates the smartwatch 402 which may include a wristband 410. The smartwatch may further include a processing unit, a battery, a memory, and a sensor. The processing unit may be configured to control the operation of the smartwatch and execute instructions stored in memory. The sensor may include various sensors, such as an accelerometer, a gyroscope, and a heart rate monitor, to measure various parameters of the user, such as physical activity and heart rate. The smartwatch may also include a communication module that enables wireless communication with other devices, such as a smartphone or a tablet.

FIG. 9B illustrates the smartphone 404, which may include a conversion apparatus similar to tablet apparatus 200 in FIGS. 5-7, but in a smartphone form factor. In combination with the smartwatch 402, the smartphone may include a processing unit, a memory, a camera, and a communication module. The communication module may include various wireless communication technologies, such as Bluetooth, Wi-Fi, and cellular network, to enable communication with other devices. The smartphone 404 may also include a fingerprint sensor, a face recognition sensor, and a voice recognition sensor to enable secure access to the device. The smartphone 404 may further include a docking mechanism that enables the smartphone to be docked for charging or communicating with other devices.

FIG. 9C illustrates a tablet 406, which may include a conversion apparatus similar to tablet apparatus 200 in FIGS. 5-7. In combination with smartphone 404, the tablet 406 may include a processing unit, a memory, a camera, and a communication module. The tablet 406 may also include a touch-sensitive display that enables the user to interact with the device using touch gestures. The tablet 406 may further include a detachable keyboard that enables the user to input text and control the device using a keyboard and a touchpad.

FIG. 9D illustrates a laptop 408, which may include a laptop apparatus similar to the laptop apparatus 100 in FIGS. 1-4. In combination with the tablet 406, the laptop 408 may include a processing unit, a memory, a camera, and a communication module. The laptop 408 may further include a built-in keyboard, touchpad, and display that enable the user to interact with the device using a traditional laptop form factor. The laptop 408 may also include various ports, such as USB, HDMI, and Ethernet, to enable connectivity with other devices.

According to some embodiments, the electronic nesting doll design disclosed herein may provide a versatile and efficient way to access computing power in various form factors. The conversion apparatuses 400 illustrated in FIGS. 9A, 9B, 9C, and 9D may enable the user to seamlessly switch between different form factors and take advantage of the benefits of each form factor. The electronic nesting doll design may also include additional conversion apparatuses that enable the user to convert between other form factors, such as a tablet that can be converted to a smart display or a laptop that can be converted to a 2-in-1 device.

In specific embodiments of the invention, a keyboard or other user interface components, or other components, can be moved between a first position and second position relative to the chassis of a device in various ways. As mentioned above, a place for a nestable device to be inserted into the device can be exposed when the component is moved from the first position to the second position. The first position and the second position can also be a position where the component is installed on the device and a position where the component has been removed from the device. The component can be moved along a hinge as shown in FIG. 5B. The component can be inserted into a socket and retained in place using a spring mechanism. The component can be inserted into a socket and retained in place using a one-way pliant bracket. The component can be attached using detachable brackets, screws, snaps, or other mechanisms. The component can be inserted into a hinged interface and then swung down into place after being inserted into the interface. Various other methods can be used to install the component into the device or move the component relative to the device.

In specific embodiments of the invention, a keyboard or other user interface components, or other components, can be added to a chassis of a device using an adjustable engagement interface. The adjustable engagement interface can be designed to accommodate different sized user interface components. The adjustable engagement interface can include a sliding mechanism to allow the interface to adjust to accept components with different sizes such as a keyboard in a first configuration and a second keyboard in a second configuration where the keyboard and the second keyboard are not congruent. In specific embodiments, the components of a device can be removable from the adjustable engagement interface to expose a nestable computing device interface for a nestable device. In keeping with the above example, removing the keyboard from the adjustable engagement interface could move the keyboard to a second position to expose a nestable computing device interface and allow a device to be docked with an installed into the device. The keyboard could then be inserted back into the adjustable engagement interface to cover the nestable device by placing the keyboard back into a first position.

Figure 10:
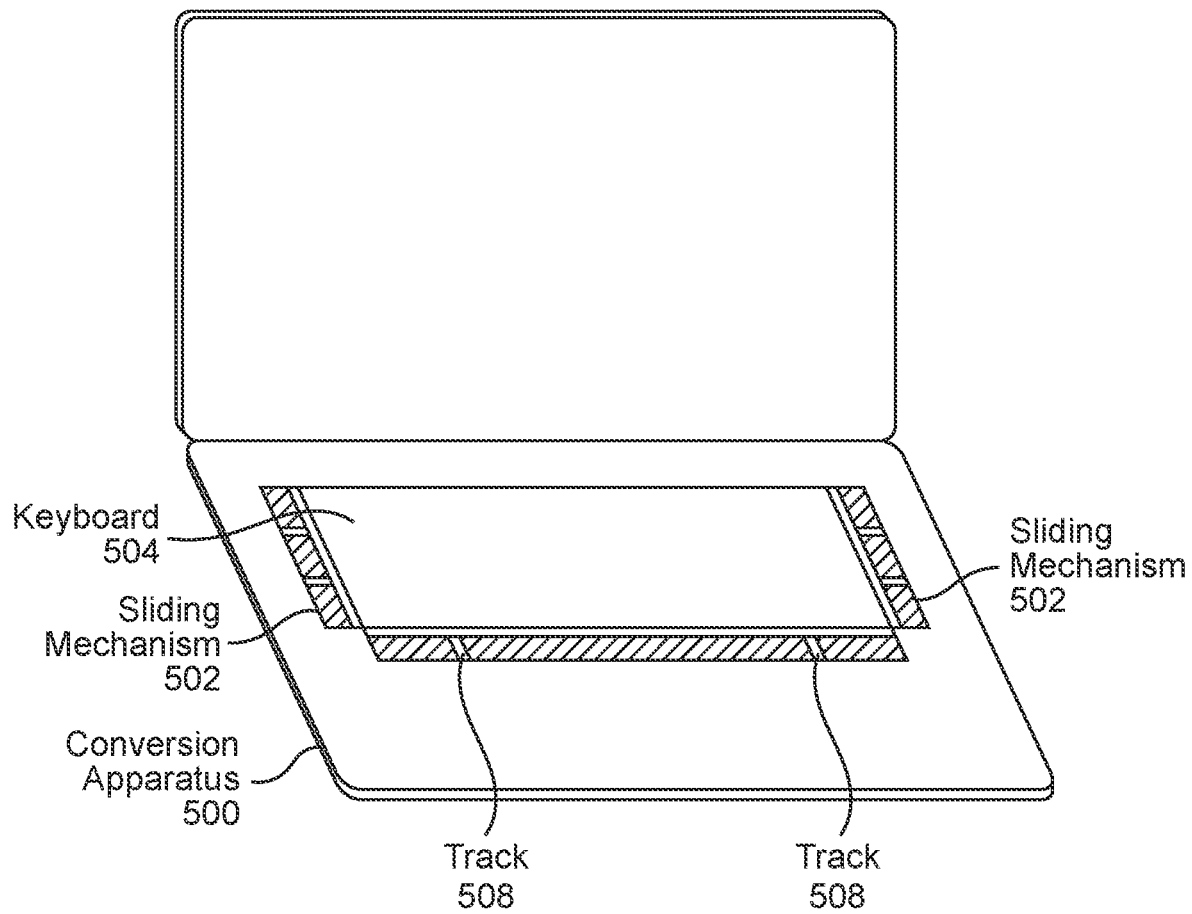
FIG. 10 provides an example of a closing and opening mechanism used to hold a keyboard in place, in accordance with specific embodiments of the inventions disclosed herein.

FIG. 10 provides an example of a conversion apparatus 500 with an adjustable engagement interface used to allow different sized keyboards to be installed into the device. The adjustable engagement interface is adjustable because sliding mechanism 502 is used to hold a keyboard 504 in place, while accommodating different keyboard sizes and shapes, by being movable along track 508 to accommodate different sized keyboards. Different keyboards can then be pressed down into the orifice formed by the adjustable engagement interface and a spring-loaded mechanism can then press the keyboard into place. The sliding mechanism may be covered by durable material, such as plastic or metal, to protect the track 508 and other components from external factors. The sliding mechanism cover may also provide an aesthetically pleasing look to the sliding mechanism 502. Additionally, a cover of the sliding mechanism may be detachable to allow for easy cleaning or replacement.

The track 508 may be a long, narrow groove that runs parallel to the surface where the keyboard is placed. The track 508 may be attached to a base or a support structure of the conversion apparatus 500. The track 508 may be made of durable material, such as plastic or metal, to withstand the pressure and weight of the keyboard. The track 508 may also be curved or angled to provide additional support or to fit the shape of the keyboard. The track 508 may include a locking mechanism to keep the adjustable engagement interface in a specific configuration once it has been sized.

In some embodiments, the sliding mechanism 502 may include additional components, such as rollers or bearings, to facilitate the movement of the adjustable engagement interface. The rollers or bearings may be attached to the bottom of the sliding mechanism 502 and roll along the track 508 to allow for smooth sliding. The rollers or bearings may be made of durable material, such as plastic or metal, to withstand the pressure and weight of the keyboard 504. The rollers or bearings may also be lubricated to reduce friction and wear.

The adjustable engagement interface may also include a spring-loaded mechanism to allow for easy removal of the keyboard 504. The spring-loaded mechanism may be located on the periphery of the orifice formed by the track and sliding mechanism and may push the keyboard 504 outwards when released. The spring-loaded mechanism may be activated by a button or a lever located on the conversion apparatus 500. The spring-loaded mechanism may also include a locking mechanism to prevent accidental release of the keyboard 504.

According to some embodiments, a docking station is provided for a nestable computing device (e.g., laptop apparatus 100, tablet apparatus 200, conversion apparatus 300, conversion apparatuses 400, conversion apparatus 500). The docking station includes a set of user interface components that comprise a display (e.g., display 102a, touchscreen display 216, display 302) and a keyboard (e.g., the keyboard and trackpad layer 104, keyboard 312), where the nestable computing device controls the set of user interface components when the nestable computing device is docked in the docking station. The set of user interface components is attached to a chassis (e.g., display layer 102, keyboard and trackpad layer 104, inside opposite touchscreen display 216, inside bottom area 224), and a nestable computing device interface is provided to secure the nestable computing device to the chassis when the nestable computing device is docked in the docking station (e.g., example area to secure ICT device 218) The nestable computing device interface can include components to secure the nestable device such as straps, snap in interfaces, brackets, clips, etc., as well as communication and power interfaces such as USB cords, dedicated power connections, wireless communication interfaces, and others. The keyboard is movable relative to the chassis between a first position (e.g., keyboard and trackpad layer 104 is "open" in FIG. 3) and a second position (e.g., keyboard and trackpad layer 104 is "closed" in FIG. 2). The nestable computing device interface for nesting the nestable device is exposed in the first position and is covered by the keyboard in the second position.

According to some embodiments, the docking station further comprises a hinge mechanism (e.g., hinges or other opening/closing mechanism 108, hinges 318) connected to the keyboard. The hinge mechanism allows the keyboard to move between the first position and the second position (e.g., to expose or cover the nestable computing device interface).

According to some embodiments, the docking station has a laptop form factor (e.g., laptop apparatus 100), and the hinge mechanism also allows the laptop to close with the display against the keyboard and open with the display pulled away from the keyboard.

According to some embodiments, the docking station further comprises a sliding mechanism (e.g., sliding mechanism 502) to engage with the keyboard. The sliding mechanism allows the keyboard to move between the first position, where the keyboard is not fully engaged with the sliding mechanism, and the second position, where the keyboard is fully engaged with the sliding mechanism, and can allow for the interface with the keyboard to be adjustable to accommodate keyboards of different sizes.

According to some embodiments, the docking station further comprises an adjustable engagement interface (e.g., a snap in interface, straps, or components of sliding mechanism 502) on the sliding mechanism. This adjustable engagement interface can be adjusted to accommodate different sized keyboards, or other elements, depending upon the preferences of the user. The adjustable engagement interface fits the keyboard in a first configuration and a second keyboard in a second configuration. The first keyboard and the second keyboard are not congruent.

According to some embodiments, the docking station further comprises a sliding mechanism (e.g., sliding mechanism 502) to engage with the keyboard and an adjustable engagement interface (e.g., components of sliding mechanism 502) on the sliding mechanism. The adjustable engagement interface fits the keyboard in a first configuration and a second keyboard in a second configuration. The keyboard and the second keyboard are not congruent.

According to some embodiments, the docking station has a touch display keyboard (e.g., touchscreen display 216).

According to some embodiments, the docking station further comprises a gap (e.g., a gap exposing the trackpad 107 in the keyboard and trackpad layer 104) in the chassis. A touch display of the nestable computing device is exposed by the gap when the nestable computing device is docked in the docking station. Alternatively, a touch display of the nestable computing device could be placed on top of the keyboard and trackpad layer 104 when it is docked in the docking station. In this manner, the touch display of the nestable computing device can serve as a track pad or other touch input for the device into which the nestable computing device itself has been inserted. For example, a laptop style device could just have a keyboard and a gap to expose the touch display of the nestable computing device while the combined device would still exhibit the experience of a laptop with both a keyboard and a track pad.

According to some embodiments, the docking station further comprises an adjustable engagement interface (e.g., the straps 116, example area to secure ICT device 218, or the orifice surrounded by sliding mechanism 502) on the nestable computing device interface. The adjustable engagement interface fits the nestable computing device in a first configuration and a second nestable computing device in a second configuration. The nestable computing device and the second nestable computing device are not congruent. The adjustable engagement interface can include at least one adjustable strap. The adjustable engagement interface can also be integrated with a sliding mechanism (e.g., sliding mechanism 502) to accommodate different sized peripherals.

According to some embodiments, the docking station does not include any processing or network communication capabilities. The docking station and the nestable computing device share a modem and processor of the nestable computing device when the nestable computing device is docked in the docking station.

According to some embodiments, a docking station is provided for a nestable computing device (e.g., laptop apparatus 100, tablet apparatus 200, conversion apparatus 300, conversion apparatuses 400, conversion apparatus 500). The docking station includes a set of user interface components such as a display and a keyboard (e.g., display 102a, keyboard and trackpad layer 104, touchscreen display 216, display 302, keyboard 312, trackpad 314), which are controlled by the nestable computing device when docked. The user interface components are attached to a chassis, and a nestable computing device interface (e.g., the straps 116, example area to secure ICT device 218) is provided to secure the device to the chassis. The docking station also includes an adjustable engagement interface (e.g., sliding mechanism 502) that fits two different keyboards in different configurations. The two keyboards are not congruent, allowing for flexibility in keyboard options.

According to some embodiments, the docking station further comprises an engagement interface to engage with the keyboard. The engagement interface can be adjustable (e.g., via a sliding mechanism). The engagement interface can allow for movement of the keyboard relative to the chassis between a first position and a second position.

According to some embodiments, the keyboard is movable via the engagement interface relative to the chassis between a first position and a second position. When in the first position, the nestable computing device interface is exposed, and when in the second position, the nestable computing device interface is covered by the keyboard.

According to some embodiments, the docking station does not include any processing or network communication capabilities. The docking station and the nestable computing device share a modem and processor of the nestable computing device when the nestable computing device is docked in the docking station.

According to some embodiments, a docking station is provided for a nestable computing device (e.g., laptop apparatus 100, tablet apparatus 200, conversion apparatus 300, conversion apparatuses 400, conversion apparatus 500). The docking station includes a first set of user interface components, which comprise a first display and a first user input interface (e.g., display 102a, keyboard and trackpad layer 104, touchscreen display 216, display 302, keyboard 312, trackpad 314). When the nestable computing device is docked in the docking station, it controls the first set of user interface components. Additionally, a first chassis (e.g., display layer 102, keyboard and trackpad layer 104, inside opposite touchscreen display 216, inside bottom area 224) is provided, which is attached to the first set of user interface components. A second docking station is also included, which comprises a second set of user interface components, including a second display and a second user interface (see, e.g., FIGS. 5A, 5B, 5C). When the nestable computing device is docked in the second docking station, it controls the second set of user interface components. The second chassis forms the second docking station, and the second set of user interface components is attached to the second chassis. The docking station further includes a first nestable computing device interface for securing the second docking station to the first chassis when the second docking station is docked to the docking station. A second nestable computing device interface is also provided for securing the nestable computing device to the second chassis when the nestable computing device is docked in the second docking station.

According to some embodiments, the docking station may have a first user input interface that is a keyboard and a second user input interface that is a touch display.

According to some embodiments, the docking station may have a laptop form factor or a tablet form factor. The second docking station may have a smartphone form factor or a tablet form factor. The nestable computing device may have a smartwatch form factor.

According to some embodiments, the docking station may be designed to accommodate a nestable computing device with a smartwatch form factor. In particular, the second nestable computing device interface may be sized to accept the nestable computing device with a smartwatch band removed (e.g., smartwatch 402 in FIG. 9B).

According to some embodiments, the docking station may include an adjustable engagement interface that fits a keyboard in a first configuration and a second keyboard in a second configuration. The first user input interface may be a keyboard, and the keyboard and the second keyboard may not be congruent.

According to some embodiments, the docking station may not include any processing or network communication capabilities, and the second docking station may not include any processing or network communication capabilities. The docking station and the nestable computing device may share a modem and processor of the nestable computing device when the nestable computing device is docked in the docking station.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network-accessible memory. Although examples in the disclosure were generally directed to an apparatus for ICT conversion, the same approaches could be utilized to convert the form factor of other electronic devices. These and other modifications and variations to the present invention may be practiced by those skilled in the art, without departing from the scope of the present invention, which is more particularly set forth in the appended claims.

What is claimed is:

1. A docking station for a nestable computing device comprising:
   a set of user interface components including a display, wherein the nestable computing device controls the set of user interface components when the nestable computing device is docked in the docking station;
   a chassis, wherein the set of user interface components are attached to the chassis; and
   a nestable computing device interface for securing the nestable computing device to the chassis when the nestable computing device is docked in the docking station;
   wherein the docking station has one of a smartphone form factor and a tablet form factor;
   wherein the nestable computing device has a smartwatch form factor;
   wherein the display is movable relative to the chassis between a first position and a second position; and
   wherein the nestable computing device interface is exposed in the first position and is covered by the display in the second position.

2. The docking station of claim 1, further comprising:
   a hinge mechanism connected to the display that allows the display to move between the first position and the second position.

3. The docking station of claim 2, wherein:
   the docking station has a laptop form factor; and
   the hinge mechanism also allows the laptop form factor to: (i) close with the display against the chassis; and (ii) open with the display pulled away from the chassis.

4. The docking station of claim 1, further comprising:
   an engagement interface to engage with a keyboard, wherein the set of user interface components includes the keyboard;
   wherein the engagement interface allows the keyboard to move between a first position, where the keyboard is not fully engaged with the engagement interface, and a second position, where the keyboard is fully engaged with the engagement interface.

5. The docking station of claim 1, further comprising:
   an adjustable engagement interface;
   wherein the adjustable engagement interface fits a first keyboard in a first configuration and a second keyboard in a second configuration; and
   wherein the first keyboard and the second keyboard are not congruent.

6. The docking station of claim 1, further comprising:
   an adjustable engagement interface;
   wherein the adjustable engagement interface is an interface for one of: the nestable computing device; a number pad; a display; a camera; a memory; a power hub; and a battery.

7. The docking station of claim 1, wherein:
   the set of user interface components includes a touch display keyboard.

8. The docking station of claim 1, further comprising:
   a gap in the chassis;
   wherein a touch display of the nestable computing device is exposed by the gap when the nestable computing device is docked in the docking station.

9. The docking station of claim 1, further comprising:
   an adjustable engagement interface on the nestable computing device interface;
   wherein the adjustable engagement interface fits the nestable computing device in a first configuration and a second nestable computing device in a second configuration;
   wherein the nestable computing device and the second nestable computing device are not congruent; and
   wherein the adjustable engagement interface is a snap in interface.

10. The docking station of claim 1, wherein:
    the docking station does not include any processing or network communication capabilities; and
    the docking station and the nestable computing device share a modem and processor of the nestable computing device when the nestable computing device is docked in the docking station.

11. A docking station for a nestable computing device comprising:
    a first set of user interface components including a first display and a first user input interface, wherein the nestable computing device controls the first set of user interface components when the nestable computing device is docked in the docking station;
    a first chassis, wherein the first set of user interface components are attached to the first chassis;
    a second docking station, wherein the second docking station has one of a laptop form factor and a tablet form factor;
    a second set of user interface components including a second display and a second user input interface, wherein the nestable computing device controls the second set of user interface components when the nestable computing device is docked in the second docking station;
    a second chassis, wherein the second chassis forms the second docking station, and wherein the second set of user interface components are attached to the second chassis for the second docking station;
    a first nestable computing device interface for securing the second docking station to the first chassis when the second docking station is docked to the docking station; and
    a second nestable computing device interface for securing the nestable computing device to the second chassis when the nestable computing device is docked in the second docking station;
    wherein the nestable computing device has a smartwatch form factor.

12. The docking station of claim 11, wherein:
    the first user input interface is a keyboard; and
    the second user input interface is a touch display.

13. The docking station of claim 11, wherein:
    the second nestable computing device interface is sized to accept the nestable computing device with a smartwatch band removed.

14. The docking station of claim 11, wherein the first user input interface is a keyboard and further comprising:
    an adjustable engagement interface that fits the keyboard in a first configuration and a second keyboard in a second configuration;
    wherein the keyboard and the second keyboard are not congruent.

15. The docking station of claim 11, wherein:
the docking station does not include any processing or network communication capabilities;
the second docking station does not include any processing or network communication capabilities; and
the docking station and the nestable computing device share a modem and processor of the nestable computing device when the nestable computing device is docked in the docking station.

\* \* \* \* \*